United States Patent
Bernier

(10) Patent No.: US 10,412,475 B2
(45) Date of Patent: Sep. 10, 2019

(54) LED LIGHT FIXTURE WITH INTEGRATED SPEAKER AND/OR SOUND DETECTION SYSTEM

(71) Applicant: Yves Bernier, Ste-Genevieve (CA)

(72) Inventor: Yves Bernier, Ste-Genevieve (CA)

( * ) Notice: Subject to any disclaimer, the term of this patent is extended or adjusted under 35 U.S.C. 154(b) by 152 days.

(21) Appl. No.: 15/534,304

(22) PCT Filed: Dec. 11, 2015

(86) PCT No.: PCT/CA2015/000598
§ 371 (c)(1),
(2) Date: Jun. 8, 2017

(87) PCT Pub. No.: WO2016/090462
PCT Pub. Date: Jun. 16, 2016

(65) Prior Publication Data
US 2017/0366886 A1 Dec. 21, 2017

Related U.S. Application Data

(60) Provisional application No. 62/090,482, filed on Dec. 11, 2014.

(51) Int. Cl.
*F21K 9/00* (2016.01)
*H04R 1/02* (2006.01)
(Continued)

(52) U.S. Cl.
CPC .............. *H04R 1/028* (2013.01); *F21K 9/00* (2013.01); *F21K 9/237* (2016.08); *F21K 9/238* (2016.08);
(Continued)

(58) Field of Classification Search
CPC ........ H04R 1/028; H04R 3/00; H04R 29/004; F21K 9/275; F21K 9/278; F21K 9/238;
(Continued)

(56) References Cited

U.S. PATENT DOCUMENTS 4,962,687 A 10/1990 Belliveau et al.
7,938,562 B2 * 5/2011 Ivey .................... F21V 33/0052
362/276
(Continued)

FOREIGN PATENT DOCUMENTS

WO 2007053645 A2 5/2007

OTHER PUBLICATIONS

International Search Report dated Feb. 16, 2016; PCT/CA2015/000598.

*Primary Examiner* — Bao Q Truong
(74) *Attorney, Agent, or Firm* — Ladas & Parry LLP

(57) ABSTRACT

A light fixture comprises a fixture body, at least one lamp mounted to the fixture body for emitting a light beam, at least one speaker device and/or at least one sound detection device and/or at least one image capturing device integrally mounted to the fixture body. The speaker device provides for emitting sound. The sound detection device provides for detecting ambient sound. The Image capturing device provides for capturing an image. A controller is in operative communication with the at least one lamp, to the at least one speaker and/or to the at least one sound detection and/or at least one image capturing device for control thereof. A system for controlling the light emitted by these light fixtures comprises a master controller for receiving information from the controller and for transmitting control signals thereto.

13 Claims, 1 Drawing Sheet

(51) Int. Cl.
| | |
|---|---|
| *F21V 33/00* | (2006.01) |
| *F21K 9/275* | (2016.01) |
| *F21K 9/278* | (2016.01) |
| *F21K 9/238* | (2016.01) |
| *F21K 9/237* | (2016.01) |
| *H04N 5/225* | (2006.01) |
| *H04N 5/232* | (2006.01) |
| *H04N 7/18* | (2006.01) |
| *H04R 3/00* | (2006.01) |
| *H04R 29/00* | (2006.01) |
| *H05B 37/02* | (2006.01) |
| *F21Y 115/10* | (2016.01) |

(52) U.S. Cl.
CPC .............. *F21K 9/275* (2016.08); *F21K 9/278* (2016.08); *F21V 33/0052* (2013.01); *F21V 33/0056* (2013.01); *H04N 5/2257* (2013.01); *H04N 5/23203* (2013.01); *H04N 7/183* (2013.01); *H04R 3/00* (2013.01); *H04R 29/004* (2013.01); *H05B 37/0236* (2013.01); *H05B 37/0272* (2013.01); *F21Y 2115/10* (2016.08)

(58) Field of Classification Search
CPC ........ F21K 9/237; F21K 9/00; F21V 33/0052; F21V 33/0056; H04N 5/2257; H04N 5/23203; H04N 7/183; H05B 37/0236; H05B 37/0272; F21Y 2115/10
See application file for complete search history.

(56) References Cited

U.S. PATENT DOCUMENTS

| | | | |
|---|---|---|---|
| 2006/0012987 | A9 | 1/2006 | Ducharme et al. |
| 2009/0196016 | A1 | 8/2009 | Massara et al. |
| 2010/0124058 | A1* | 5/2010 | Miller .................... F21S 8/038 362/249.02 |
| 2014/0354160 | A1* | 12/2014 | Aggarwal .......... H05B 37/0227 315/152 |

* cited by examiner

LED LIGHT FIXTURE WITH INTEGRATED SPEAKER AND/OR SOUND DETECTION SYSTEM

CROSS-REFERENCE TO RELATED APPLICATIONS

The present application claims priority on U.S. Provisional Application No. 62/000,482 filed on Dec. 11, 2014 and Incorporated herein by reference in its entirety.

TECHNICAL FIELD

The present disclosure relates to a light fixture. More particularly, but not exclusively, the present disclosure relates to a LED light fixture with one or more speakers integrated thereto and/or an integrated sound detection system such as one or more microphones.

BACKGROUND

An LED lamp is a light-emitting diode (LED) product that is assembled into a lamp (or light bulb) for use in lighting fixtures. LED lamps have a better lifespan and electrical efficiency than other types of lamps. A significant difference from other light sources is that the light is more directional emitting as a narrower beam. LED tube lights are designed to physically fit in fixtures intended for fluorescent tubes. Some LED tube lamps are intended to be a drop-in replacement into existing fixtures. Others require rewiring of the fixtures to remove the ballast. Others require rewiring of the fixtures to replace the ballast with a LED driver. An LED tube lamp generally uses many individual LEDs which are directional. Fluorescent lamps emit light all the way around the lamp. Most LED tube lights available can be used in place of T5, T8, T10, or T12 tube designations, in lengths of 1, 2, 3, 4, 5, and 8 ft. LED lighting for residential, industrial, commercial and public uses is becoming common.

OBJECTS

An object of the present disclosure is to provide a LED light fixture with one or more speakers integrated thereto.

An object of the present disclosure is to provide a LED light fixture with an integrated sound detection system.

An object of the present disclosure is to provide a LED light fixture with one or more speakers integrated thereto and an integrated sound detection system.

In accordance with an aspect of the disclosure there is provided a LED light control system for controlling the light emitted by light fixture with one or more speakers integrated thereto or a LED light fixture with an integrated sound detection system, or a LED light fixture with one or more speakers integrated thereto and an integrated sound detection system.

SUMMARY

In accordance with an aspect of the disclosure there is provided a light fixture comprising: a fixture body; at least one lamp mounted to the fixture body for emitting a light beam; at least one speaker device integrally mounted to the fixture body for emitting sound; and a controller in operative communication with the at least one lamp and to the at least one speaker for control thereof.

In an embodiment, this light fixture further comprises at least one sound detection device integrally mounted to the fixture body for detecting ambient sound, wherein the controller is in operative communication with the at least one sound detection device for control thereof. In an embodiment, this light fixture further comprises at least one image capturing device integrally mounted to the fixture body for capturing an image, wherein the controller is in operative communication with the at least one Image capturing device for control thereof.

In accordance with an aspect of the disclosure there is provided a light fixture comprising: a fixture body; at least one lamp mounted to the fixture body for emitting a light beam; at least one sound detection device integrally mounted to the fixture body for detecting ambient sound; and a controller in operative communication with the at least one lamp and to the at least one sound detection device for control thereof.

In an embodiment, this light fixture further comprises at least one speaker device integrally mounted to the fixture body for emitting sound, wherein the controller is in operative communication with the at least one speaker device in device for control thereof. In an embodiment, this light fixture further comprises at least one image capturing device integrally mounted to the fixture body for capturing an image, wherein the controller is in operative communication with the at least one image capturing device for control thereof.

In accordance with an aspect of the disclosure there is provided a light fixture comprising: a fixture body; at least one lamp mounted to the fixture body for emitting a light beam; at least one speaker device Integrally mounted to the fixture body for emitting sound; at least one sound detection device integrally mounted to the fixture body for detecting ambient sound; at least one image capturing detection device integrally mounted to the fixture body for capturing an image; and a controller in operative communication with the at least one lamp, to the at least one speaker, to the at least one sound detection device, and to the at least one image capturing device for control thereof.

In accordance with an aspect of the disclosure there is provided a light control system for controlling the light emitted by the light fixtures described herein, the system comprising: remote master controller in operative communication with the controller described herein for receiving information therefrom regarding the operation of any one of the lamp, the speaker device or the sound detection device and for transmitting a control to signal to the controller in order to modulate the operation of any one of the lamp, the speaker device or the sound detection device.

In an embodiment, there is provided a light fixture comprises a fixture body, at least one lamp mounted to the fixture body for emitting a light beam, at least one speaker device and/or at least one sound detection device and/or at least one image capturing device integrally mounted to the fixture body. The speaker device provides for emitting sound. The sound detection device provides for detecting ambient sound. The image capturing device provides for capturing an image. A controller is in operative communication with the at least one lamp, to the at least one speaker and/or to the at least one sound detection and/or at least one image capturing device for control thereof. A system for controlling the light emitted by these light fixtures comprises a master controller for receiving information from the controller and for transmitting control signals thereto.

In an embodiment, the controller comprises a memory of predetermined criteria, the controller modulating the light emitted by the at least one lamp based on the memory of predetermined criteria. In an embodiment, the controller comprises a memory of predetermined criteria, the controller modulating the sound emitted by the at least one speaker based on the memory of predetermined criteria. In the embodiment, the controller comprises a memory of predetermined criteria, the controller modulating the images captured by the at least one image capturing device based on the memory of predetermined criteria. In an embodiment, the controller comprises a memory of predetermined criteria, the controller modulating the sound detected by the sound detection device based on the memory of predetermined criteria.

In an embodiment, the controller controls light emitted by the at least one lamp based on the sound emitted by the speaker. A in an embodiment, the controller controls sound emitted by the speaker based on the light emitted by the at least one lamp. In an embodiment, the wherein the controller controls light emitted by at least one lamp based on the sound detected by the sound detection device. In an embodiment, the controller controls light emitted by at least one lamp based on the image captured by the image capturing device.

In an embodiment, when one is not included hereinabove, the light fixture also comprises at least one sound detection device integrally mounted to the fixture body for detecting ambient sound, wherein the controller is in operative communication with the at least one sound detection device for control thereof. In an embodiment, when one is not included hereinabove, the light fixture also comprises least one image capturing device integrally mounted to the fixture body for capturing an image, wherein the controller is in operative communication with the at least one image capturing device for control thereof. In an embodiment, when one is not included hereinabove, the light fixture also comprises at least one speaker for emitting sound, wherein the controller is in operative communication with the at least one speaker for control thereof.

In an embodiment, the sound detection device comprises a microphone.

In an embodiment, the at least one the image capturing device comprises a mini-camera.

In an embodiment, the light fixture further comprise a surge protector and/or surge arrestor and/or filter to decrease harmonics and/or others unwanted waves or contaminants and/or to protect the light fixture equipment.

In an embodiment, the light fixture further comprises thermoelectric elements to decrease heat and energy consumption.

In an embodiment, the light fixture further comprises a video display in operational communication with the controller. In an embodiment, the video display is remote from the light fixture.

In an embodiment, the lamp comprises an LED lamp.

Other objects, advantages and features of the present disclosure will become more apparent upon reading of the following non-restrictive description of illustrative embodiments thereof, given by way of example only with reference to the accompanying drawings.

DETAILED DESCRIPTION OF ILLUSTRATIVE EMBODIMENTS

Generally stated and in accordance with an embodiment, there is provided a light fixture comprising a fixture body; at least one lamp mounted to the fixture body such as an LED lamp for emitting a light beam. In one embodiment, at least one speaker device is integrally mounted to the fixture body for emitting sound. In another embodiment, at least one sound detection device is integrally mounted to the fixture body for detecting ambient sound. In another embodiment, at least one image capturing device is integrally mounted to the fixture body for capturing an image. In a further embodiment, any two or all three of the foregoing devices are integrally mounted to the fixture body. A controller is in operative communication with the at least one lamp, to the at least one speaker, to the at least one sound detection device, or to the image capturing device for control thereof, A system is also provided for controlling the light emitted by the light fixtures described herein, this system comprises a master controller for receiving information regarding the operation of the lamps, speaker devices, sound detection devices, or image capturing devices described herein and for transmitting a control signal to the controller described herein for modulating the operation of the lamps, speaker devices, sound detection devices and image capturing devices described herein.

In an embodiment, there is provided a light fixture comprising a fixture body, at least one lamp mounted to the fixture body for emitting a light beam, at least one speaker device and/or at least one sound detection device and/or at least one image capturing device and/or at least one image projection device and/or at least one particle detection device and/or at least one particles production device Integrally mounted to the fixture body. The speaker device provides for emitting sound. The sound detection device provides for detecting ambient and/or oriented sound. The image capturing device provides for capturing an image or signal. The image projection device for emitting an image or signal. The particle detection device provides for detecting a particle. The particle generating device provides for emitting a particle. A controller is in operative communication with the at least one lamp, to the at least one speaker and/or to the at least one sound detection and/or at least one image capturing device and/or at least one image projection device and/or at least one particle detection device and/or at least one particles production device for control thereof. A system for controlling the light and/or sound emitted by these light fixtures and/or fixture body and/or devices comprises a master controller for receiving information from the controller and for transmitting control signals thereto.

With reference, to the appended Figures, non-restrictive illustrative embodiments will be herein described so as to further exemplify the disclosure only and by no means limit the scope thereof.

Figure 1:
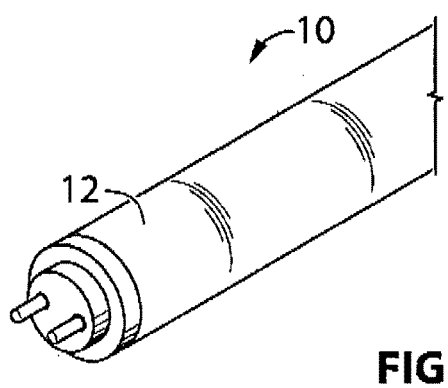
FIG. 1 is a perspective view of the front side of a light fixture with a frosted lens in accordance with an illustrative embodiment of the preset description.
Figure 2:
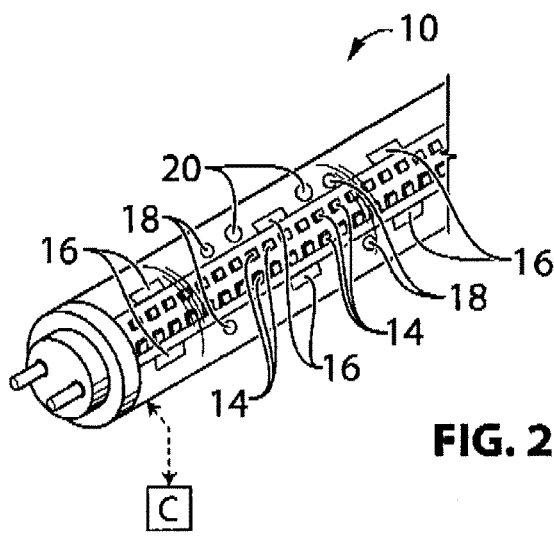
FIG. 2 is a perspective view of the front side of the light fixture of FIG. 1 with a clear lens in accordance with an illustrative embodiment of the preset description.

FIGS. 1 and 2 show a light fixture 10 including a fixture body 12. The fixture body 12 includes LED light lamps 14 mounted along the length thereof for emitting a light beam.

The fixture body 12 also includes a plurality of speaker devices 16 integrated thereto along the length thereof for emitting sound. Additionally the light fixture 10 may also include a sound detection system in the form of a plurality of sound detection devices 18 such as microphones for example. Moreover, the light fixture 10 may also include image capturing devices 20 in the form of a plurality of mini-cameras for example.

The lamps 14, speaker devices 16, the microphones 18 and the mini-cameras 20 are operationally linked to a controller C, The controller C is selected from a variety of integrated or remote microcomputers or computers. The controller provides for controlling and modulating the operation of the lamps 14, speaker devices 16, the microphones 18 and the mini-cameras 20 based on predetermined criteria.

For example, the controller C may control the lighting emitted by the lamps 14 based on the sound emitted by speakers 18, the sound captured by the microphones 18 or the images captured by the mini-cameras 20.

The controller C can be inside fixture 10 or fixture body 12 or completely outside (PC, tablet, smart phone and the like devices)

Figure 4:
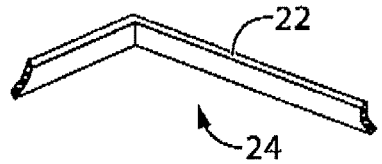
FIG. 4 is a perspective front side view of yet another light fixture in accordance with an illustrative embodiment of the preset description.

The light fixture 10 is provided in the form of tubular structure. Theses light fixtures 10 can be assembled within a panel 22 and such provided a light fixture assembly 24 as shown in FIG. 4.

Figure 3:
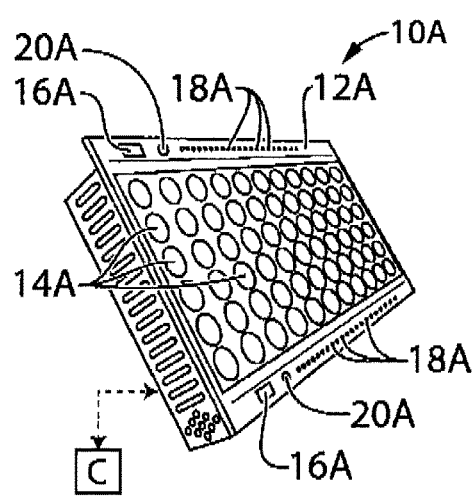
FIG. 3 is a perspective front side view of another light fixture in accordance with an illustrative embodiment of the preset description.

FIG. 3 shows another example of a light fixture, namely light fixture 10A having a fixture body 12A. The fixture body 12A includes LED light lamps 14A, speaker devices 16A integrated thereto, sound detection devices 18A, and image capturing devices 20A. The foregoing devices are linked to a controller C.

Figure 5:
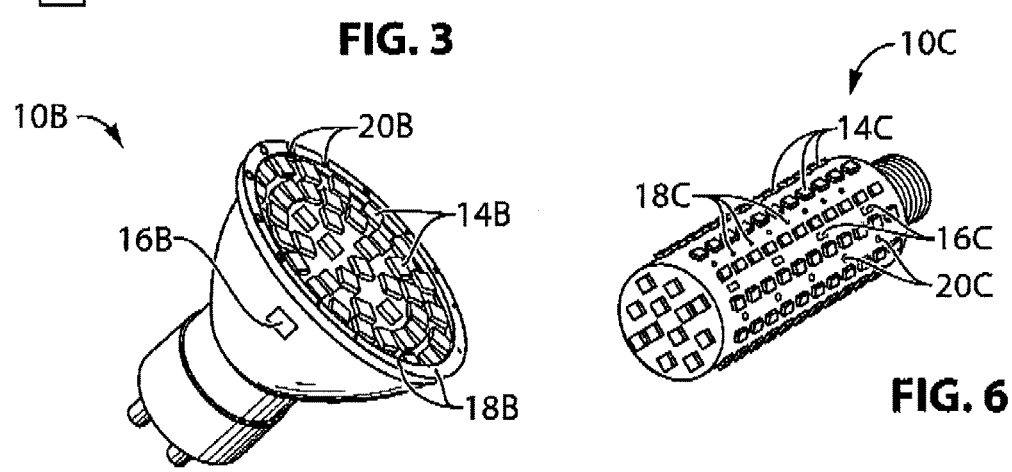
FIG. 5 is a perspective front view of still another light fixture in accordance with an illustrative embodiment of the preset description.
Figure 6:
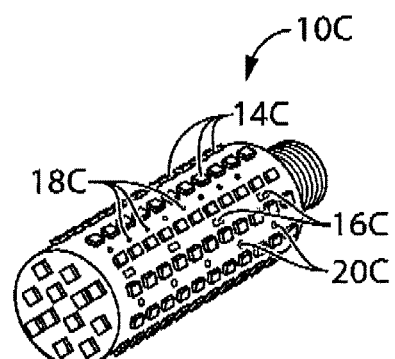
FIG. 6 is a perspective front view of still yet another light fixture in accordance with an illustrative embodiment of the preset description.

FIGS. 5 and 6 show light fixtures 10B and 10C having plurality of LED lamps 14B and 14C respectively mounted to their respective fixture bodies 12B and 12C. The fixtures 12B and 12C include respective speakers 16B, 16C, respective microphones 18B, 18C, and respective micro-cameras 20B, 20C.

Therefore, the present disclosure provides intelligent luminaries or light fixtures. Each luminary may include one or more internal or external speakers via wire or wireless connection. Each luminary may also include one or more external or internal cameras linked thereto via wire or wireless connection, Each luminary may also include one or more external or internal sound devices via wire or wireless connection. Each luminaries, light fixture or fixture body can be used for the interior and/or exterior of the buildings and other structures.

In a further embodiment, the luminary may include a gas detector in order to detect a gas leak or a fire. In a further embodiment, the image capturing device may be a motion detector. In other embodiments, the luminary may also include devices selected from a hydrometer, pressure detector, a luminosity detector, an infrared system, a temperature detector, a timer, and the like. In an embodiment, the luminary may be used as an intercom. In an embodiment, the luminary may include thermoelectric elements. In another embodiment, the luminary may be used as an exit indicator (arrows on the floor, instructions etc.).

As such, the luminary may be sues as an emergency, security, communication, music, publicity or surveillance (visual and sound) system. The luminary security system may be directional or bidirectional (alarm sound, flashing, facial recognition, thermal reconnaissance) and be linked to a central system. The luminary communications system may be directional or bidirectional (audio and visual input or output). Bidirectional sound communication is provided by microphones, speakers, sirens and the like. Bidirectional visual communication is provided by cameras, projectors, lasers and light modulation (intensity, colour, flashing etc.). The luminary provides for easily installing a plurality of cameras in order to monitor movement, position and events. Bidirectional non visual communication is provided by radar or others emitting devices as is known in the art. Communication can be made from and/or to humans, animals, controllers or others luminaries.

The luminary may provide for varying the intensity, colour, color temperature, color rendering index of the light emitted or to flash.

The luminary may be linked via wire or wireless connection to other communications, security, production or control equipment.

The luminary may be a single integrated piece or be modular and constructed of assembled and interchangeable components. The components may be internal or external and connected together via wire or wireless communication.

The luminary may be in the form of an interrupter, a wall electrical outlet, a junction box and the like, in order to communicate bidirectional information.

The luminary may be used in all kinds of sites, such as old or new building that do not offer passages for passing additional wiring and that can contain asbestos and as such holes in walls, floors and ceilings cannot be easily made.

The luminary and/or components may be a retrofit kit or a complete new fixture and/or components.

The luminary may be used to feed external components (USB, HDMI, display ports and the like) in order to recharge cellular phones, tablet PC or others; feed publicity screens; cameras; alarms and the like.

A plurality of luminaries can communicate with each other (e.g. mesh networking).

The various components of the luminaries may be seamlessly constructed on the body thereof in order to provide a smooth design surface.

In an embodiment, the some of the luminaries of a plurality of assembled luminaries do not emit light.

The light fixtures or luminaries may be provided in any new form including the traditional form of lighting fixtures, lamps, tubes or bulbs.

The tube luminaries may be provided in various configurations as is known in the art. These tubes may be powered by either side, one side or both sides and can include or not a ballast, a driver or a controller (internal or external).

The luminaries herein may interact directly or indirectly with other components in a home, a building, a site, a community, or an intelligent city.

An advantage of the present luminaries is that they use already existing sources of electricity and that no new power wiring is necessary for their installation. For a new construction, it uses planned sources for lighting or related equipment.

The various features described herein can be combined in a variety of ways within the context of the present disclosure so as to provide still other embodiments. As such, the embodiments are not mutually exclusive. Moreover, the embodiments discussed herein need not include all of the features and elements illustrated and/or described and thus partial combinations of features can also be contemplated. Furthermore, embodiments with less features than those described can also be Contemplated. It is to be understood that the present disclosure is not limited in its application to the details of construction and parts illustrated in the accompanying drawings and described hereinabove. The disclosure is capable of other embodiments and of being practiced in various ways. It is also to be understood that the phraseology or terminology used herein is for the purpose of description and not limitation. Hence, although the present disclosure has been provided hereinabove by way of non-restrictive illustrative embodiments thereof, it can be modified, without departing from the scope, spirit and nature thereof and of the appended claims.

What is claimed is:

1. A light fixture comprising:
   a fixture body;
   at least one LED lamp mounted to the fixture body for emitting a light beam;
   at least one speaker device integrally mounted to the fixture body for emitting sound;
   at least one sound detection device integrally mounted to the fixture body for detecting ambient sound;
   at least one image capturing device integrally mounted to the fixture body for capturing images;
   at least one video display, one of: integrally mounted to the fixture body and remote from the fixture body, for emitting an image or a signal;
   at least one of: a thermoelectric element, a particle detection device, a particle projection device, a gas detector, a hydrometer, a pressure detector, a luminosity detector, and a temperature detector, being integrally mounted to the fixture body; and
   a controller in operative communication with the at least one LED lamp, to the at least one speaker, to the at least one sound detection device, to the at least one image capturing device, to the at least one video display and to the at least one of the thermoelectric element, the particle detection device, the particle projection device, the gas detector, the hydrometer, the pressure detector, the luminosity detector, and the temperature detector, for control thereof.

2. A light fixture according claim 1, wherein the controller comprises a memory of predetermined criteria, the controller modulating the light emitted by the at least one LED lamp based on the memory of predetermined criteria.

3. A light fixture according to claim 1, wherein the controller comprises a memory of predetermined criteria, the controller modulating the sound emitted by the at least one speaker device based on the memory of predetermined criteria.

4. A light fixture according claim 1, wherein the controller comprises a memory of predetermined criteria, the controller modulating the sound detected by the at least one sound detection device based on the memory of predetermined criteria.

5. A light fixture according claim 1, wherein each one of the at least one sound detection device comprises a microphone.

6. A light fixture according to claim 1, wherein each one of the at least one image capturing device comprises a mini-camera.

7. A light fixture according to claim 1, wherein the controller comprises a memory of predetermined criteria, the controller modulating the images captured by the at least one image capturing device based on the memory of predetermined criteria.

8. A light fixture according to claim 1, wherein the controller controls light emitted by the at least one LED lamp based on the sound emitted by the speaker.

9. A light fixture according to claim 1, wherein controller controls sound emitted by the at least one speaker based on the light emitted by the at least one LED lamp.

10. A light fixture according to claim 1, wherein the controller controls light emitted by the at least one LED lamp based on the sound detected by the at least one sound detection device.

11. A light fixture according to claim 1, wherein the controller controls light emitted by the at least one LED lamp based on the images captured by the at least one image capturing device.

12. A light fixture according to claim 1, wherein the thermoelectric element functions to decrease heat and energy consumption.

13. A light fixture according to claim 1, wherein the at least one video display is in operational communication with the controller.

* * * * *